Dec. 8, 1964     R. N. DAVIS     3,160,086
APPARATUS FOR DUPLICATING REELABLE FILM
Filed Nov. 27, 1961     2 Sheets-Sheet 1

INVENTOR.
RONALD N. DAVIS
BY
Le Roy J. Leishman
AGENT

Dec. 8, 1964  R. N. DAVIS  3,160,086
APPARATUS FOR DUPLICATING REELABLE FILM
Filed Nov. 27, 1961  2 Sheets-Sheet 2

INVENTOR.
RONALD N. DAVIS
BY
LeRoy J. Leishman
AGENT

United States Patent Office 3,160,086
Patented Dec. 8, 1964

3,160,086
APPARATUS FOR DUPLICATING
REELABLE FILM
Ronald N. Davis, 18182 Bigelow Park Drive,
Tustin, Calif.
Filed Nov. 27, 1961, Ser. No. 155,085
10 Claims. (Cl. 95—77.5)

The invention herein described pertains to equipment for duplicating film, and more particularly to motion picture or microfilm duplicating apparatus that may be used in a lighted room.

One of the objects of the present invention is to improve the detail in the reproduced film.

Another object is to provide improved means for avoiding slippage between the master film and the duplicating film during the printing process in order to keep the original and the reproduction in perfect registration.

An additional object is to provide driving means for assuring that the light rays will pass through the original and duplicating films in relatively straight lines.

Still another object is to provide a light source and optical system combination that will direct the rays from the reproducing lamp toward the original film in a near-parallel beam.

A further object is the provision of means whereby a plurality of light source and optical system combinations may be placed along the original and duplicating films at spaced intervals to speed up the printing process without producing an excessive concentration of heat at any one place.

Another object is to provide compact means for transporting the original and duplicating films from their supply reels around a duplicating drum, and for moving the original and duplicating films from the drum to a rewind reel and a developing chamber respectively, and thence, in the case of the latter, to a second rewind reel.

Another object is the provision of means for inspecting the original film after it leaves the supply reel and before it is superimposed over the duplicating film around the printing drum.

A further object is the provision of similar means for inspecting the developed film as it leaves the developing chamber and proceeds to a rewind reel.

An additional object is to provide driving means whereby a single motor and a plurality of chains or belts may be used to drive the printing drum as well as the two rewind cylinders.

Yet another object is the provision of efficient duplicating apparatus to take advantage of the properties of Diazo-type film for making reproductions in a normally lighted room and for utilizing a simple chamber in which the film after exposure may be developed by ammonia vapor or other suitable developing agents.

Still other objects will appear as the specification proceeds.

Figure 3:
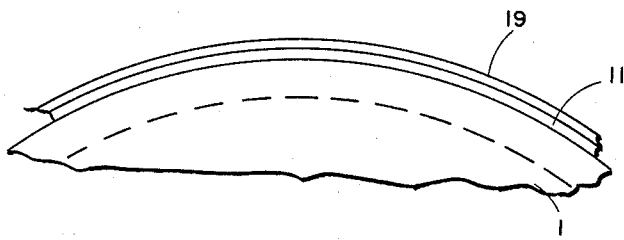

FIG. 3 includes a section of the periphery of a printing drum with substantially corresponding sections of a duplicating film and a master or original film superimposed thereon.

Figure 4:
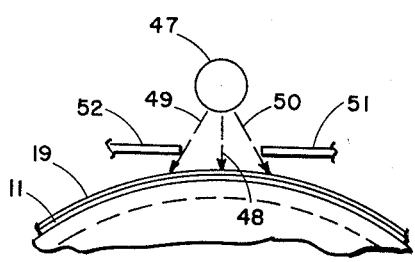

FIG. 4 is a diagrammatic representation of a light source with a portion of its beam passing through an original film and a duplicating film, showing how the rays normally spread out and do not pass in straight lines through the two films in all portions of the area being illuminated.

In the presently preferred form of my apparatus, I rotatably mount a drum or "capstan" 1 on a supporting member 2. The drum 1 is keyed against relative rotation on a drive shaft 3 which passes through the support 2. On the reverse side of this support, as shown in phantom, a worm gear 4 is also mounted against relative rotation on the drive shaft 3. A worm 5, meshing with the worm gear 4, is affixed to the drive shaft of, or appropriately driven by, a motor 6.

Clustered around the drum 1, but spaced therefrom in order to permit the interposition of other parts, are four reels. Reel 7 is a rotation-resisting supply reel for the original or master film. Reel 8 is a similar rotation-resisting supply reel for the "raw" duplicating film. Reel 9 is a wind-up reel for the original film, and reel 10 is a similar wind-up reel for the developed duplicating film. The means for driving the wind-up reels will be explained after the particular requirements which they must meet have become apparent.

As the duplicating film 11 leaves the rotation-retarding reel 8, it passes counterclockwise around an idler roller 12 and thence clockwise around another idler roller 13, from whence it encircles the greater part of the polished periphery of the printing drum 1. When the duplicating film leaves the periphery of this drum, it partially encircles the idler sprocket 14, proceeding in a clockwise direction, and it then traverses a portion of the periphery of the idler sprocket 15 in a counterclockwise direction. From there the film extends downwardly (in the particular orientation illustrated in FIG. 1) and around still another roller 16 as it proceeds to the developing chamber 17. The developing chamber will be discussed after various features of the film transport mechanism have been explained.

If the film 11 grips the periphery of drum 1 as the drum rotates in the direction of arrow 18, the film will of course be taut around the idlers 13 and 12 and as far back as the point where it leaves the supply reel 8, which is appropriately loaded against any rotation excepting that imparted to it by the motion of the film itself. The film 11 will grip the periphery of drum 1 if the film is taut as it leaves the drum as well as when it first contacts the periphery of the drum after leaving the idlers 13 and 12. If the film is taut between the idler rollers 14 and 16, it will of course be taut as it leaves drum 1, and as a consequence the film will grip all portions of the periphery of drum 1 that it traverses.

Figure 1:
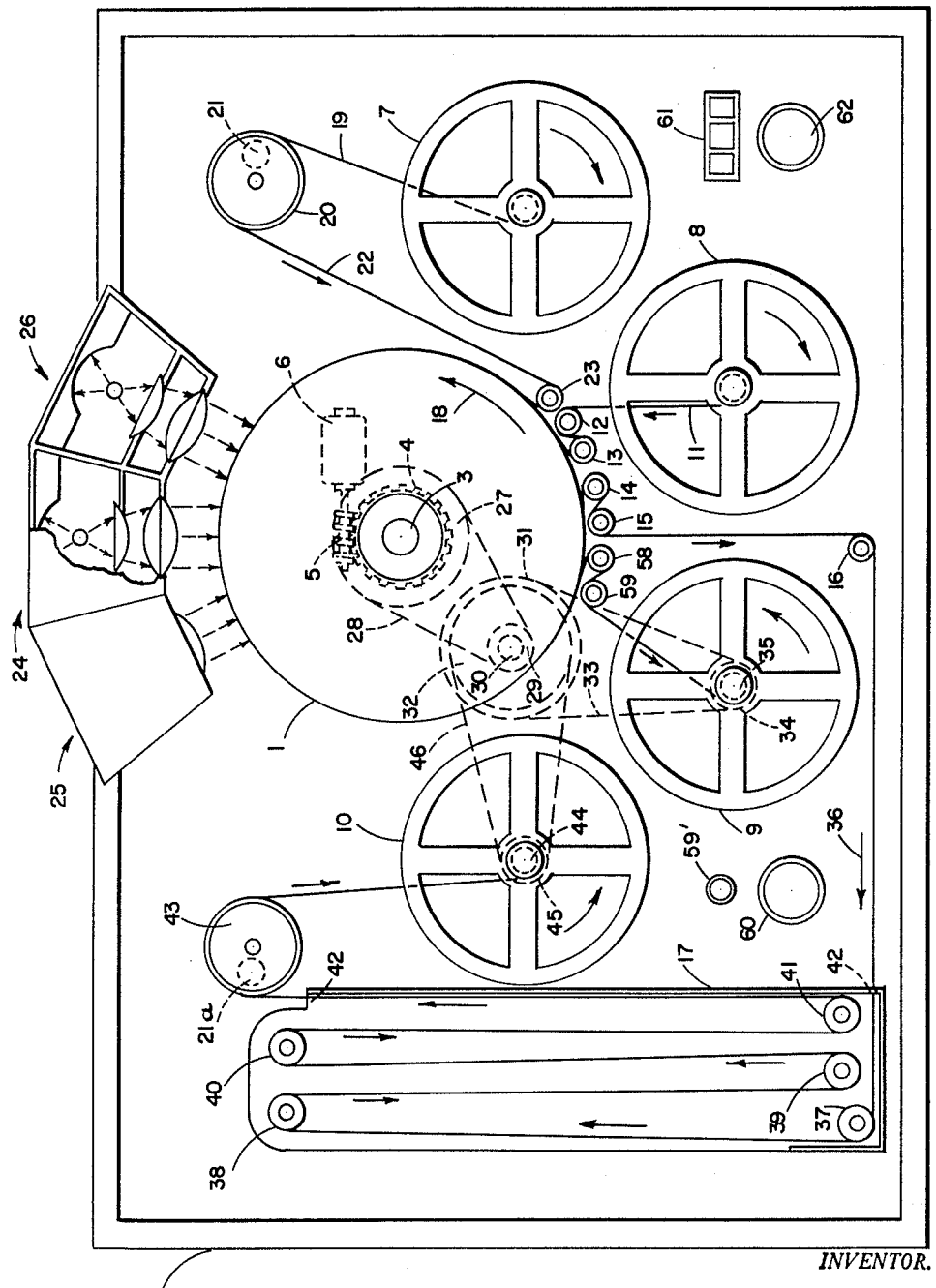
FIG. 1 is a front elevation of one embodiment of my invention in which the principal components are mounted on the front of a panel and the various driving means on the reverse side.

The looping of the film is reverse directions around the idler rollers 14 and 15 produces a snubbing or belaying effect and helps materially to maintain traction on the drum in case tension on the film should be relaxed after it leaves roller 15. The same kind of snubbing effect is produced on the film between the supply reel 8 and the drum 1 by the rollers 12 and 13 that are interposed here. The reversely looped idlers in each case act on the film in much the same way that cleats or belaying pins act on a rope. As shown in FIG. 1, the idlers 12, 13, 14, 15, 58 and 59 are all placed close to the drum to facilitate the snubbing and belaying action. Practical considerations, of course, require that sufficient space be provided to permit the easy threading of the film around the rollers.

The means whereby tension is applied to the reproducing film as it proceeds downward from roller 14 and around the idler roller 16 will be discussed after the functions of other elements of the apparatus have been described.

As the original film 19 leaves the rotation-resisting reel 7, it passes around the inspection drum 20, which has a transparent cylindrical wall. The inspection drum is illuminated from within by an appropriate light source 21. The light rays from this source pass through the transparent cylindrical walls of the drum and thence through the original film 19 as it proceeds around the inspection drum's periphery. The speed of transport is usually sufficiently slow to permit such inspection as may be desired.

After the film leaves the inspection drum, it passes around an idler roller 23 which lays the original film on top of the duplicating film on the printing drum 1. After traversing more than three quarters of the periphery of this drum, the original film leaves it to pass around idler roller 58 in a clockwise direction and then around idler 59 in a counterclockwise direction, from whence it proceeds to the wind-up reel 9. This reel is driven through a slipping clutch, not shown, at a potential speed that can always rewind the film as fast as the movement of the drum will permit. As consequence, the original film is always under tension and acts like a band clutch clamping the duplicating film between it and the polished periphery of the drum 1. The clutch-like action of the original or master film against the duplicating film prevents any slippage and helps very materially to produce a very sharp image on the under film as the near-parallel rays from one or more of the optical systems 24, 25 and 26 pass through the outer master. These light systems will be discussed later in the specification.

As already explained, the printing drum 1 is driven by a drive shaft 3 to which power is transmitted from the motor 6 by means of the worm 5 and the worm wheel 4 attached to shaft 3. A pulley 27 is also rigidly mounted on shaft 3 for rotation therewith. An appropriate belt or chain 28, which passes around the pulley 27, drives the smaller pulley 29 on shaft 30. These pulleys, as indicated by the phantom lines, are on the opposite side of the support 2 from the drum 1 and the various reels. Two other larger pulleys 31 and 32, like the small pulley 29, are rigidly mounted on shaft 30. The belt or chain 33 passes around pulleys 31 and 34, the latter having provisions, not shown, for driving the shaft 35 by any appropriate clutching device that will permit the film being wound up to be kept taut without danger of breakage.

The duplicating film, which we left after tracing its movement as far as the idler pulley 16, moves therefrom in the direction of arrow 36 into the developing tank 17, where it passes in succession around idler rollers 37, 38, 39, 40 and 41, and then out of the developing chamber through the seal 42 to the periphery of the inspection drum 43. This drum, where the developed film may be inspected, may be a duplicate of inspection drum 20 on which the master film may be viewed. A suitable illuminating source 21a, similar to source 21 in the drum 20, may of course be provided in the drum 43.

After leaving drum 43, the developed film is wound on reel 10. This reel may be rigidly mounted on the drive shaft 44 which, on the opposite side of the supporting member 2, carries a pulley 45 that drives the shaft 44 through an appropriate slipping clutch when this pulley is rotated by means of the belt 46. This belt is driven by the larger pulley 32 rigidly attached to shaft 30, as previously mentioned.

The slipping clutch that is part of the driving means for reel 10 is neither shown nor described, as its specific construction is not pertinent to this invention. However, the speed of the driving portion of the clutch is such that the slipping driven portion will rotate the reel at a yielding speed determined by the peripheral speed of the drum 1. As a consequence, the duplicating film is kept taut as it passes around the reading drum, the various rollers in the developing chamber, as well as around the idler rollers 16, 15 and 14 after the film leaves the reproducing drum 1.

It will be noted in the figures that each of the films passes around at least two idler rollers or drums between the time that it leaves the associated supply reel and the printing drum, and that at least two idlers are also operatively interposed between the printing drum and each of the wind-up reels. These pairs or clusters of idlers help very materially to maintain the tension that produces the necessary traction between the two films as well as between the inside or reproducing film and the periphery of the drum 1, which drives both films at a speed that may be adjusted for the optimum exposure of the reproduced film to the rays that pass through the master film from the various printing light sources.

The presently preferred embodiment of my invention, as previously indicated, contemplates the use of one or more exterior light sources with associated optical systems spaced around the periphery of the drum 1, but many of the important features of the invention are useful with an internal light source or sources directing their rays through a transparent periphery. With the latter arrangement, the master film must of course be in contact with the drum, and the duplicating film must be on the outside. The passing of the rays through the cylindrical walls of the drum naturally entails a certain loss of light. Furthermore, scratches on the drum's periphery impair the quality of the reproduction, and the transparency of the walls tends to diminish with use.

Heretofore, the scattering rays from conventional external printing light sources have resulted in a blurring of the image, as should be clear from an examination of FIG. 4 where the rays 48, 49 and 50 may be seen diverging and scattering from the light source 47. The central ray 48 is normal to the films 19 and 11, but rays 49 and 50 are far from normal and therefore do not reach the duplicating film 11 at points that are directly below those through which these rays pass through the original or master film 19. These diverging rays of course tend to blur the image, with the result that the maximum sharp detail that is possible with diazo-type film is not attained. To diminish the bad effects of printing rays that are not normal to the two films, masks or limiters 51 and 52 have heretofore been used. The present invention not only makes it possible to use a larger portion of the rays available from the printing light source, but directs these beams in substantially parallel paths toward the center of the printing drum, as will be seen in FIGS. 1 and 2.

Figure 2:
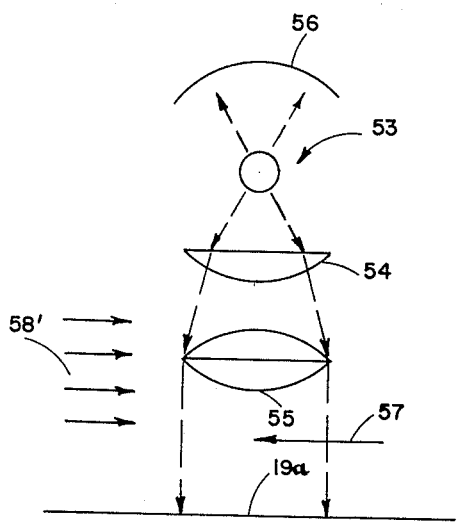
FIG. 2 is a diagram of an optical system whereby I converge the available rays from an ultraviolet source into a near-parallel light beam.

FIG. 2 illustrates diagrammatically my superior light source and associated optical system. Inasmuch as diazo-type film is sensitive to ultraviolet light rather than to visible rays, a characteristic that makes it possible to duplicate this film in a normally lighted room, it is desirable that the light source for such printing purposes be rich in ultraviolet rays. Ordinary glass is a poor transmitter of ultraviolet light, and I therefore prefer to use quartz lenses, interposing a plano-convex lens 54 between the light source 53 and a double convex lens 55, in order by this multiple lens arrangement to concentrate the rays into a near-parallel light beam, as indicated in the figure. To utilize not only the rays that are moving downwardly through the optical system directly from the light source but those that are passing upwardly as well, I provide a reflector 56.

To reduce the heat generated by this light and optical system, and to prevent it from injuring the film 19a, cooling air 58 may be directed onto the lenses and the film as well as into the paths of the rays on either or both sides of the lenses. As a further means of keeping the temperature at a low level, it is well to use as large a printing drum as space will permit so that it will present more surface to the film to absorb and dissipate its heat.

An increase in the intensity of light reaching the film of course increases the printing speed, but even when cooling air is employed, the printing speed is limited by the heat of the rays passing through the lenses and reaching the master film. By using three banks of light sources and associated lens systems each directing an independent column of rays toward the film, the speed of printing may be substantially tripled, as all the printing does not have to be done within the limited area covered by the rays from one light source alone. If diazo film is used, a portion of the changes that are required in the light-sensitive materials may be effected in the exposure area served by one light source, and the remainder of the desired chemical changes may be produced by the exposure of the diazo film through the master film within the range of other light sources. If the speed of printing is carried to the limit permissible by the heat beneath a single light source, additional speed is of course possible within the safe temperature range by spreading out the area affected by the heat through the use of additional sources. It will be obvious that many light units such as 24, 25, and 26 may be spaced around the periphery of the printing drum.

In order to use the available light at even greater efficiency for printing purposes, the periphery of the printing drum 1 is polished so that the printing rays that pass through both films may be reflected back to make additional chemical changes in the duplicating film.

The knobs 59 and 60 control the developing process by means not shown or described here for the reason that they form no part of this invention per se.

The small windows within the escutcheon 61 and the control 62 are associated with the control of the film transporting mechanism which, like the developing process controls, are not described here because no particular type is essential for the present purpose.

Detailed description of the rotation-resisting, or rotation-retarding, supply reels is likewise omitted because no specific arrangement is required. The resistance, of course, must be to forward rotation, and this can be accomplished by friction, back-drag or by any other means that will prevent the film from being unreeled excepting in response to the pull of the printing drum itself. As a matter of fact, these supply reels may be yieldingly driven in a reverse direction through a slipping clutch similar or identical to those employed for the wind-up reels 9 and 10. It is the traction between the duplicating film and the printing drum, and between the master film and the duplicating film, that moves them forward, and no more torque is required for the wind-up reels than is necessary to keep tension on the films. The same kind of tension in a reverse direction is all that is required of the supply reels; in fact, if these supply reels are driven in a reverse direction through a slipping clutch, all that is needed to use them as rewind reels is to reverse the direction of rotation of the printing drum. In other words, no change or reversal of any kind is necessary in the drives for the four reels for rewind purposes if the two supply reels and the two wind-up reels are yieldingly driven in opposite directions.

In the appended claims, the term "rotation resisting reel" covers reels whose rotation is retarded by friction or back-loading of any kind, or whose rotation in a forward direction is yieldingly resisted by means that urge the reels in a reverse direction through any kind of a slipping drive.

Not only may different instrumentalities be used interchangeably for the various controls and drives mentioned herein, but substitutions may be made for any of the other elements set forth in the following claims. Furthermore, transpositions may be effected and parts combined without departing from their broad scope and spirit.

I claim:

1. In a machine for the duplication of film that may be reeled, a combination including: a panel; a rotatable printing drum secured to a first shaft passing through said panel; means for rotating said first shaft, said means located on the opposite side of said panel from said drum; a first rotation-resisting reel for supplying duplicating film to the periphery of said drum; a first idler guide roller operatively interposed between said printing drum and a developing chamber, said roller so positioned that said film, after having traversed a portion of said printing drum, will extend partially around said roller and change its direction of travel en route to said chamber; a second rotation-resisting reel for supplying original film; means for so guiding said original film as it approaches said drum that it will be superimposed over the duplicating film thereon; a wind-up reel for receiving said original film from said printing drum, said wind-up reel secured to a second shaft passing through said panel; and instrumentalities for yieldingly rotating said second shaft at such speed that it will place constant tension on the film being wound up, said instrumentalities located on the opposite side of said panel from said wind-up reel.

2. In a machine for the duplication of film that may be reeled, a combination including: a rotatable printing drum; means for rotating said drum; a first rotation-resisting reel for supplying duplicating film to the periphery of said drum; a developing chamber; a first idler guide roller operatively interposed between said printing drum and said chamber, said roller so positioned that said film, after having traversed a portion of said printing drum, will extend partially around said roller and change its direction of travel en route to said chamber; a second rotation-resisting reel for supplying original film; an idler drum having transparent peripheral walls, said idler drum so located and operatively interposed between said second rotation-resisting reel and said printing drum that the original film may traverse a portion of the periphery of the idler drum as it proceeds from said second rotation-resisting reel to said printing drum; means within said idler drum for illuminating the original film through the cylindrical wall of the idler drum; guiding means interposed between said idler drum and said printing drum for superimposing the original film over the duplicating film; a first wind-up reel for receiving said original film from said printing drum; means for yieldingly rotating said first wind-up reel at such speed that it will place constant tension on the film being rewound; a second wind-up reel for receiving the developed duplicated film from said chamber; and means for yieldingly rotating said second wind-up reel at such speed that it will place constant tension on the duplicating film leaving said printing drum and proceeding through said chamber.

3. In a machine for the duplication of film that may be reeled, a combination including: a rotatable printing drum; means for rotating said drum; a first rotation-resisting reel for supplying duplicating film to the periphery of said drum; a first idler guide roller operatively interposed between said printing drum and a developing chamber, said roller so positioned that said film, after having traversed a portion of said printing drum, will extend partially around said roller and change its direction of travel enroute to said chamber; a second rotation-resisting reel for supplying original film; means for so guiding said original film as it approaches said drum that it will be superimposed over the duplicating film thereon; a wind-up reel for receiving said original film from said printing drum; means for yieldingly rotating said wind-up reel at such speed that it will place constant tension on the film being wound up; and a second and a third idler roller so operatively interposed between said printing drum and said first rotation-resisting reel and so located with respect to each other and to said drum that the film from said last mentioned reel may pass over the second roller and under the third and thereby be subjected to a snubbing action.

4. In a machine for the duplication of film that may be reeled, a combination including: A rotatable printing drum; means for rotating said drum; a first rotation-resisting reel for supplying duplicating film to the periphery of said drum; a developing chamber; a first idler guide roller operatively interposed between said printing drum and said chamber, said roller so positioned that said film after having traversed a portion of said printing drum, will extend partially around said roller and change its direction of travel en route to said chamber; a second rotation-resisting reel for supplying original film; means for so guiding said original film as it approaches said printing drum that it will be superimposed over the duplicating film then traversing said drum; a first wind-up reel for receiving said original film from said printing drum; means for yieldingly rotating said wind-up reel at such speed that it will place constant tension on the film being wound; a second wind-up reel for receiving the developed duplicated film from said chamber; means for yieldingly rotating said second wind-up reel at such speed that it will place constant tension on the duplicating film leaving said printing drum and proceeding through said chamber; and a second idler roller so operatively interposed between said printing drum and said first wind-up reel that film leaving said drum and passing around said second idler roller will have traversed more than three-fourths of the periphery of said drum.

5. In a machine for the duplication of film that may be reeled, a combination including: a rotatable printing drum; means for rotating said drum; a first rotation-resisting reel for supplying duplicating film to the periphery of said drum; a first idler pulley operatively interposed between said printing drum and a developing chamber, said idler pulley so positioned that said firm, after having traversed a portion of said printing drum, will extend partially around said idler pulley and change its direction of travel en route to said chamber; a second rotation-resisting reel for supplying original film; means for so guiding said original film as it approaches said drum that it will be superimposed over the duplicating film thereon; a wind-up reel for receiving said original film from said printing drum; means for yieldingly rotating said wind-up reel at such speed that it will place constant tension on the film being wound up; and a second and a third idler pulley so operatively interposed between said second rotation-resisting reel and said printing drum and so located with respect to each other and to said drum that the film leaving said second-rotation-resisting reel may pass over the second pulley and under the third and thereby be subjected to a snubbing or belaying action.

6. In a machine for the duplication of film that may be reeled, a combination including: a rotatable printing drum; means for rotating said drum; a first rotation-resisting reel for supplying duplicating film to the periphery of said drum; a first idler pulley operatively interposed between said printing drum and a developing chamber, said idler pulley so positioned that said film, after having traversed a portion of said printing drum, will extend partially around said idler pulley and change its direction of travel en route to said chamber; a second rotation-resisting reel for supplying original film; means for so guiding said original film as it approaches said drum that it will be superimposed over the duplicating film thereon; a wind-up reel for receiving said original film from said printing drum; means for yieldingly rotating said wind-up reel at such speed that it will place constant tension on the film being wound up; and a second and a third idler pulley so operatively interposed between said printing drum and said wind-up reel and so located with respect to each other and to said drum that the film leaving said drum will pass under said second pulley and over said third and thereby be subjected to a belaying action.

7. In a machine for the duplication of film that may be reeled, a combination including: a rotatable printing drum; means for rotating said drum; a first rotation-resisting reel for supplying duplicating film to the periphery of said drum; a developing chamber; a first idler guider roller operatively interposed between said printing drum and said chamber, said roller so positioned that said film, after having traversed a portion of said printing drum, will extend partially around said roller and change its direction of travel en route to said chamber; a second rotation-resisting reel for supplying original film; means for so guiding said original film as it approaches said printing drum that it will be super-imposed over the duplicating film then traversing said drum; a first wind-up reel for receiving said original film from said printing drum; means for yieldingly rotating said wind-up reel at such speed that it will place constant tension on the film being wound; a second wind-up reel for receiving the developed duplicated film from said chamber; means for yieldingly rotating said second wind-up reel at such speed that the duplicating film will be under constant tension as it leaves said drum and proceeds through said chamber; an inspection drum operatively interposed between said chamber and said second wind-up reel, said inspection drum having a transparent periphery traversed by said duplicating film en route from said chamber to said second wind-up reel; and illuminating means within said inspection drum for illuminating the duplicated film through said periphery.

8. In a machine for the duplication of film that may be reeled, a combination including: a rotatable printing drum; means for rotating said drum; a first rotation-resisting reel for supplying duplicating film to the periphery of said drum; a developing chamber; a first idler guide roller operatively interposed between said printing drum and said chamber, said roller so positioned that said film, after having traversed a portion of said printing drum, will extend partially around said roller and change its direction of travel en route to said chamber; a second rotation-resisting reel for supplying original film; an idler drum having transparent peripheral walls, said idler drum so located and operatively interposed between said second rotation-resisting reel and said printing drum that the original film may traverse a portion of the periphery of the idler drum as it proceeds from said second rotation-resisting reel to said printing drum; means within said idler drum for illuminating the original film through the cylindrical wall of the idler drum; guiding means interposed between said idler drum and said printing drum for superimposing the original film over the duplicating film; a first wind-up reel for receiving said original film from said printing drum; means for yieldingly rotating said first wind-up reel at such speed that it will place constant tension on the film being rewound; a second wind-up reel for receiving the developed duplicated film from said chamber; means for yieldingly rotating said second wind-up reel at such speed that the duplicating film will be under constant tension as it leaves said drum and proceeds through said chamber; an inspection drum operatively interposed between said chamber and said second wind-up reel, said inspection drum having a transparent periphery traversed by said duplicating film en route from said chamber to said second wind-up reel; and illuminating means within said inspection drum for illuminating the duplicated film through said periphery.

9. In a machine for the duplication of film that may be reeled, a combination including: a rotatable printing drum; means for rotating said drum; a first rotation-resisting reel for supplying duplicating film to the periphery of said drum; a first idler guide roller operatively interposed between said printing drum and a developing chamber, said roller so positioned that said film, after having traversed a portion of said printing drum, will extend partially around said roller and change its direction of travel en route to said chamber; a second rotation-resisting reel for supplying original film; means for so guiding said original film as it approaches said drum that it will be superimposed over the duplicating film thereon; a wind-up reel for receiving said original film from said printing drum; means for yieldingly rotating said wind-up reel at such speed that the film being wound up will be under constant tension; a light source; and optical means for converging rays from said source into a beam of near-parallel rays and directing said beam onto the films traversing said printing drum.

10. In a machine for the duplication of film that may be reeled, a combination including: a panel; a first shaft passing through said panel; a rotatable printing drum secured to said first shaft; means for rotating said first shaft, said means including a motor and speed-reducing contrivances operatively interposed between said motor and said shaft, said means located on the opposite side of said panel from said drum; a first rotation-resisting reel for supplying duplicating film to the periphery of said drum; a developing chamber; a first idler guide roller operatively interposed between said printing drum and said chamber, said roller so positioned that said film after having traversed a portion of said printing drum, will extend partially around said roller and change its direction of travel en route to said chamber, a second rotation-resisting reel for supplying original film; means for so guiding said original film as it approaches said printing drum that it will be superimposed over the duplicating film then traversing said drum; a first wind-up reel for receiving said original film from said printing drum said first wind-up reel mounted on a second shaft passing through said panel; means for yieldingly rotating said wind-up reel at such speed that it will place constant tension on the film being wound; a second wind-up reel for receiving the developed duplicated film from said chamber, said second wind-up reel mounted on a third shaft passing through said panel; and instrumentalities for yieldingly rotating said second and third shafts so that constant tension will be placed upon the films being wound upon said first and second wind-up reels, said instrumentalities being driven by said motor and being located on the opposite side of said panel from said wind-up reels.

References Cited by the Examiner
UNITED STATES PATENTS

| | | | |
|---|---|---|---|
| 2,386,856 | 10/45 | Houston | 95—75 |
| 2,394,817 | 2/46 | Sonne | 95—75 |
| 2,515,862 | 7/50 | Carlton | 95—4.5 X |
| 2,552,255 | 5/51 | Capstaff | 95—74 |
| 2,586,286 | 2/52 | Andreas | 95—75 |

NORTON ANSHER, *Primary Examiner.*
D. B. LOWE, *Examiner.*